United States Patent
Hopkins

(10) Patent No.: US 12,347,117 B2
(45) Date of Patent: Jul. 1, 2025

(54) METHOD FOR TRACKING DIGITAL ASSETS VIA STATISTICAL STEGANOGRAPHY

(71) Applicant: UPSKINS LTD., London (GB)

(72) Inventor: Alistair Hopkins, Deiniolen (GB)

(73) Assignee: UPSKINS LTD., London (GB)

( * ) Notice: Subject to any disclaimer, the term of this patent is extended or adjusted under 35 U.S.C. 154(b) by 495 days.

(21) Appl. No.: 17/952,789

(22) Filed: Sep. 26, 2022

(65) Prior Publication Data

US 2023/0120852 A1 Apr. 20, 2023

Related U.S. Application Data

(60) Provisional application No. 63/256,907, filed on Oct. 18, 2021.

(51) Int. Cl.
*G06T 7/20* (2017.01)

(52) U.S. Cl.
CPC ...... *G06T 7/20* (2013.01); *G06T 2207/10016* (2013.01)

(58) Field of Classification Search
CPC ............ G06T 7/20; G06T 2207/10016; G06T 1/0021; G06V 2201/09; G06F 21/16; G06F 21/44; G06Q 30/0201; G06Q 99/00; H04N 21/2541; H04N 21/8358

USPC ......................................................... 382/103
See application file for complete search history.

(56) References Cited

U.S. PATENT DOCUMENTS

| | | | |
|---|---|---|---|
| 6,026,193 A | 2/2000 | Rhoads | |
| 6,831,991 B2 | 12/2004 | Fridrich et al. | |
| 7,496,210 B2 | 2/2009 | Shi et al. | |
| 7,822,223 B2 | 10/2010 | Shi et al. | |
| 9,491,518 B2 | 11/2016 | Wright et al. | |
| 10,204,274 B2 * | 2/2019 | Smith, IV | H04N 21/23608 |
| 2022/0366494 A1 * | 11/2022 | Cella | H04L 9/50 |

\* cited by examiner

*Primary Examiner* — Neil R McLean
(74) *Attorney, Agent, or Firm* — Panitch Schwarze Belisario & Nadel LLP

(57) ABSTRACT

A method automatically detects digital assets embedded into video frames or images. Each digital asset includes a plurality of embedded graphical representation elements with each element embedding an individual character of the digital asset's unique identification code. The video frames or images are automatically scanned for the presence of embedded graphical representation elements with each detected element decoded to extract its individual character. The resultant extracted characters are then statistically analyzed in an attempt to reconstruct the digital asset's unique identification code.

8 Claims, 9 Drawing Sheets

200

202

| Video Frame | Extracted Characters from Detected Graphically Formatted Elements ||||||||
| | Index 0 | Index 1 | Index 2 | Index 3 | Index 4 | Index 5 | Index 6 | Index 7 |
|---|---|---|---|---|---|---|---|---|
| 1 | Z | | h | h | | | | |
| 2 | | X | | | b | | B | |
| 3 | Z | X | | | | | | s |
| 4 | X | | h | h | | | | |
| 5 | Z | | h | h | | | | |
| 6 | | | | | b | | B | s |

| Matched Characters | Probability of False Match out of 1,000 Digital Asset ID Codes | Probability of False Match out of 10,000 Digital Asset ID Codes | Probability of False Match out of 100,000 Digital Asset ID Codes |
|---|---|---|---|
| 8 | 0 | 0 | 0 |
| 7 | 0.0000000002 | 0.0000000022 | 0.0000000224 |
| 6 | 0.0000000145 | 0.0000001455 | 0.0000014548 |
| 5 | 0.0000009304 | 0.0000093122 | 0.0000931223 |
| 4 | 0.0000595415 | 0.0005956318 | 0.0059250886 |
| 3 | 0.0037964149 | 0.0367417130 | 0.2761312518 |
| 2 | 0.1960745829 | 0.7094004966 | 0.9606513281 |
| 1 | 0.9397930386 | 0.9936400676 | 0.9993604029 |
| 0 | 1 | 1 | 1 |

FIG. 2B

METHOD FOR TRACKING DIGITAL ASSETS VIA STATISTICAL STEGANOGRAPHY

CROSS-REFERENCE TO RELATED APPLICATIONS

This application claims priority to U.S. Provisional Patent Application No. 63/256,907 filed Oct. 18, 2021, which is incorporated by reference herein.

FIELD OF THE INVENTION

The present disclosure relates to a system and method for tracking digital assets (e.g., two or three dimensional images or models embedded in games, programs, and/or video streams) thereby allowing the creator and/or owner of the digital asset to maintain monitoring and control regardless of the platform or video stream in which the digital asset is embedded. Specifically, the inherent aspects of this disclosure enable statistical encoding of mostly ergodic identification data of digital assets in an underlying two or three dimensional ("2D" or "3D") model such that the true identity of any embedded digital asset can be economically derived from any resulting video stream or image.

BACKGROUND OF THE INVENTION

Steganography is the practice of concealing a message within another message or a physical object. With computing embodiments, steganography typically involves embedding covert data within a transport layer, such as a digital document, image, program, audio, video, or protocol. Digital steganography began in earnest circa 1985 when personal computers were applied to classical steganography problems.

For example, one known prior art method of concealing steganographic digital data in graphic images is by replacing the least significant bit of each byte of a graphic image with bits of the steganographic digital data. With this technique, the graphic image itself does not change appreciably since most graphic standards specify more gradations of color or light intensity than the human eye can detect—e.g., a 64-kilobyte steganographic message may be stored covertly in a 1024×1024 grayscale image. Numerous other image centric steganographic techniques have been developed over the years (e.g., Bit-Plane Complexity Segmentation steganography or "BPCS-steganography", pictures embedded in video feeds) that have also expanded the art.

Some notable prior art digital steganography contributions have been developed over the years, specifically: U.S. Pat. No. 6,026,193 (Rhoads); U.S. Pat. No. 6,831,991 (Fridrich et al.); U.S. Pat. No. 7,496,210 (Shi et al.); U.S. Pat. No. 7,822,223 (Shi et al.); and U.S. Pat. No. 9,491,518 (Wright et al.). However, all of the cited prior art discloses steganographic systems and methods are typically utilized for overall digital images and are completely silent on applying steganography to specific embedded objects within digital images, or more to the point, steganography of embedded objects in video streams—e.g., user generated content based on programmatic output, a video stream from a game mixed with live video and then broadcast on a social media platform, etc.

Thus, there is a significant marginalization of protection or tracking for creators and owners of digital assets with the prior art since digital assets are typically embedded in third party games or programs which generate their own independent video streams and therefore typically become out of the control of the digital asset creator or owner. Consequently, valuable digital assets may illicitly appear in undesirable media possibly damaging the brand of the digital asset, or loss of potential revenue for embedded digital assets may be realized due to the lack of traceability, or digital assets may be incorporated into another digital medium independent of the model in which the asset is initially embedded—e.g., video recording of a gaming session uploaded to the Internet. When it is realized that the increasing prevalence of user generated content derived from programmatic output often includes digital assets, it can be appreciated that the problem of maintaining and controlling valuable digital assets through second, third, or "n" levels removed from the original (licensed) model will only proliferate for the foreseeable future.

A simplistic solution to this vexing problem might be to merely add graphical barcodes embodying unique serial numbers into each digital asset. The added embedded barcodes enabling machine identification of embedded digital assets regardless of the resulting image or video stream. However, graphical barcodes sufficient to embody digital asset identification data are obvious and consequently easily thwarted. Additionally, graphical barcodes are aesthetically unattractive and thus typically would not be acceptable to consumers of the digital asset. Also, the creator of the digital asset does not typically control the orientation of the asset in whatever two or three-dimensional (2D or 3D) model it is embedded, possibly resulting in the graphical barcode not being visible and therefore not decodable. Finally, normal operation of the 2D or 3D model that any digital asset is embedded may result in the occlusion of the digital asset by other parts of the model and/or the orientation of the asset within the model-again possibly resulting in the graphical barcode being unusable.

An alternative approach to identifying digital assets in models and/or video streams might be to utilize machine learning algorithms to identify any digital asset present in video streams or images. However, the variety and diversity of digital assets which may be identified is potentially very large most likely resulting in each asset or class of assets requiring its own discretely trained model or the retraining of an existing model. Given that any tracking process should preferably be generic so that the process can be utilized for the dissemination of a large library of digital assets, this approach would result in high training dataset needs and the training and/or execution of huge numbers of models for each video steam or image to be tested in parallel. This would be cost-prohibitive both in monetary and computer processing terms.

It is therefore highly desirable to develop techniques and methodologies for ensuring detection and identification of digital assets embedded in models and/or video streams. Ideally, these detection and identification mechanisms would also inherently provide error correction and data reconstruction for the detected asset's digital data which are typically presented in noisy environments. The present disclosure essentially eliminates or solves problems of management of digital assets in models, image, and/or video streams.

SUMMARY OF THE INVENTION

A general aspect of the present disclosure relates to assigning a unique identification code to each family and/or specific digital asset and then breaking the assigned unique identification code into individual characters. Each character is then transformed into a graphical representation element that typically includes both an index of the character and the character itself. The created character graphical representation element is then concealed in at least one digital asset with, preferably, a plurality of graphically represented elemental associate characters concealed in multiple embodiments of the same at least one digital asset. A computer program is then created which can identify and decode the graphical representational elements embedded in the digital assets. Typically, the computer program will first recognize the outline of the graphical representation element of the digital asset with a subsequent program or subroutine decoding the concealed data embedded in the digital asset from the extracted graphical representation. This automated process of recovering at least one unique identification code for each family and/or unique digital asset is preferably based on a statistically ergodic recovery mechanism.

In an optional preferred specific embodiment of this general aspect, a plurality of sampled frames from video stream(s) or image(s) are compiled into a table of characters detected and decoded from the digital assets embedded in the sample frames or images. With this embodiment, the resultant compiled table undergoes a statistical analysis of its recovered characters in an attempt to reconstruct and thereby discern the probable values of the recovered characters.

In another optional preferred embodiment, the values of characters in the derived compiled table are subjected to a subsequent statistical analysis where the recovered characters are ergodically compared to the set of known identification codes. This supplemental reconstruction and error correction process ultimately determining the probability of the set of reconstructed characters being a match to a master a priori preassigned asset "family" identity code.

In a specific embodiment, a plurality of digital assets or families of digital assets with different identification codes are embedded within the same model, video stream, and/or image(s). The plurality of embedded digital assets or digital asset families are then separately identified, thereby enabling tracking of each digital asset and/or family of digital assets. In a specific related embodiment, this separate tracking of multiple digital assets within the same model is accomplished by assigning different graphical formats to each digital asset or digital asset family thereby enabling separate identification and decoding. In another specific related embodiment, each individual digital asset or family of digital assets is virtually isolated by spatial analysis within the model, video stream, and or image(s) prior to identification and decoding.

In another specific embodiment, each digital asset or digital asset family is assigned a particular graphically formatted shape to enable identification, extraction, and orientation. With this specific embodiment the character data within the digital asset is encoded as different elements within the particular graphically formatted shape where the color, shade, and/or presence or absence of each element determines its embedded character data.

In all of these embodiments, digital assets or families of digital assets are assigned unique identification codes. The essential concept of the disclosure being to provide a reliable identification and management of embedded digital assets in models, video streams, and/or images.

Objects and advantages of this disclosure will be set forth in part in the following description, or may be apparent from the present description, or may be learned through practice of the disclosure. Described are a number of value assignment mechanisms and methodologies that provide practical details for reliably and securely distributing digital assets of varying value over two or more dimensional virtual space thereby ensuring reliable identification. Although the examples provided herein are primarily related to games which use 3D graphics engines to produce both 2D and Augmented Reality (AR) and/or Virtual Reality (VR) output, it is clear that the same methods are applicable to any type of application which uses 3D graphics engines to produce output.

BRIEF DESCRIPTION OF THE DRAWINGS

The foregoing summary, as well as the following detailed description of this disclosure, will be better understood when read in conjunction with the appended drawings. For the purpose of illustrating this disclosure, there are shown in the drawings embodiments which are presently preferred. It should be understood, however, that this disclosure is not limited to the precise arrangements and instrumentalities shown. In the drawings:

FIG. 2A is an exemplary compiled table of characters detected and decoded from digital asset graphically formatted elements embedded in sample frames or images in accordance with the embodiments of FIGS. 1A and 1B;

FIG. 2B is a second exemplary table of the probability of the number of characters matched deriving the correct digital assets code in accordance with the embodiments of FIGS. 1A, 1B, and FIG. 2A;

DETAILED DESCRIPTION OF THE INVENTION

Certain terminology is used herein for convenience only and is not to be taken as a limitation on the present disclosure. The words "a" and "an", as used in the claims and in the corresponding portions of the specification, mean "at least one."

Reference will now be made in detail to examples of the present disclosure, one or more embodiments of which are illustrated in the figures. Each example is provided by way of explanation of the disclosure, and not as a limitation of the disclosure. For instance, features illustrated or described with respect to one embodiment may be used with another embodiment to yield still a further embodiment. It is intended that the present application encompass these and other modifications and variations as come within the scope and spirit of the disclosure.

Preferred embodiments of the present disclosure may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

Figure 1A:
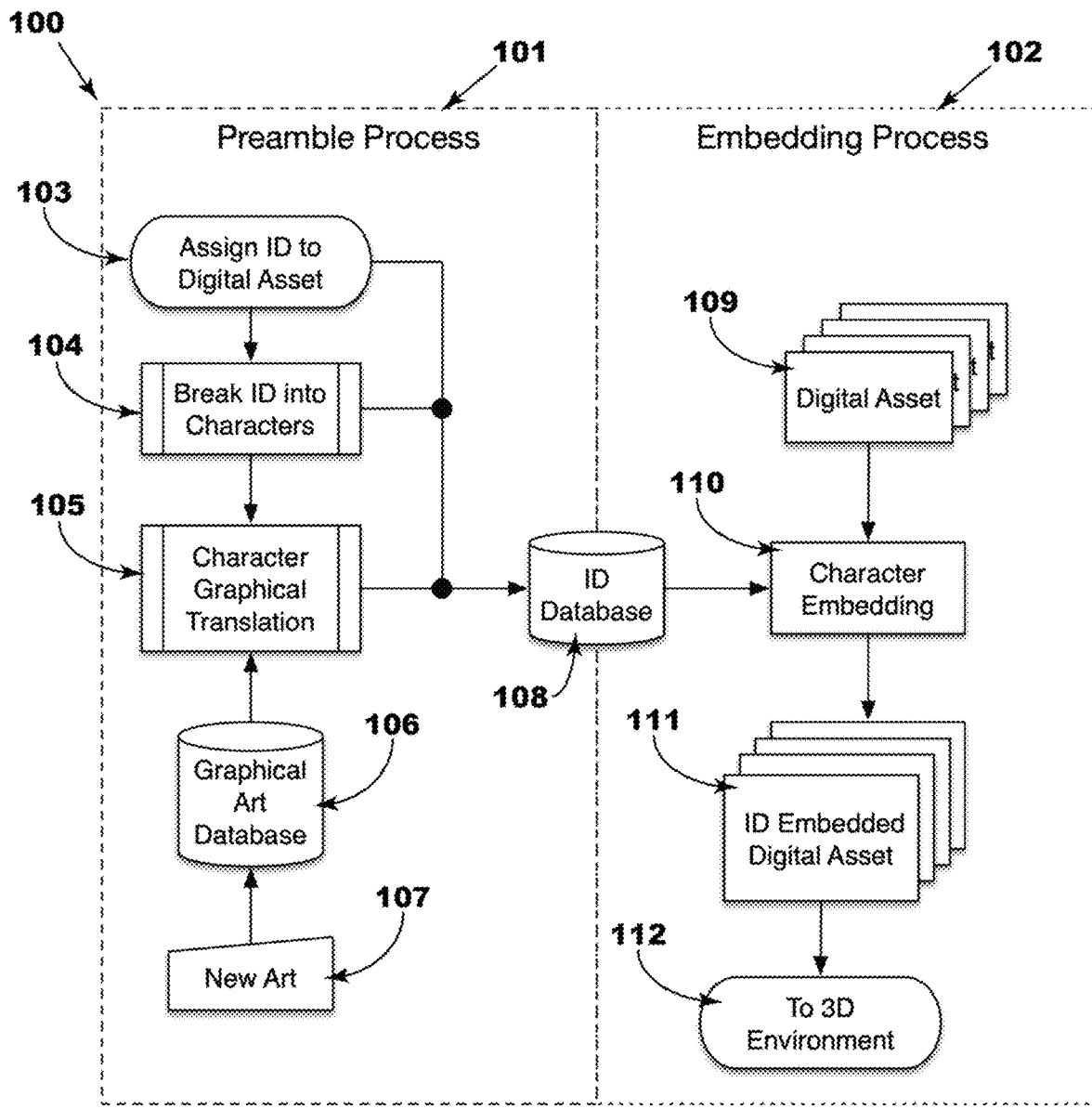
FIG. 1A is an overall swim lane block diagram representative example providing a schematic graphical overview of a general embodiment of the system associated with generating and embedding the digital assets and/or a family of digital assets into a model, video stream, and/or image(s)
Figure 1B:
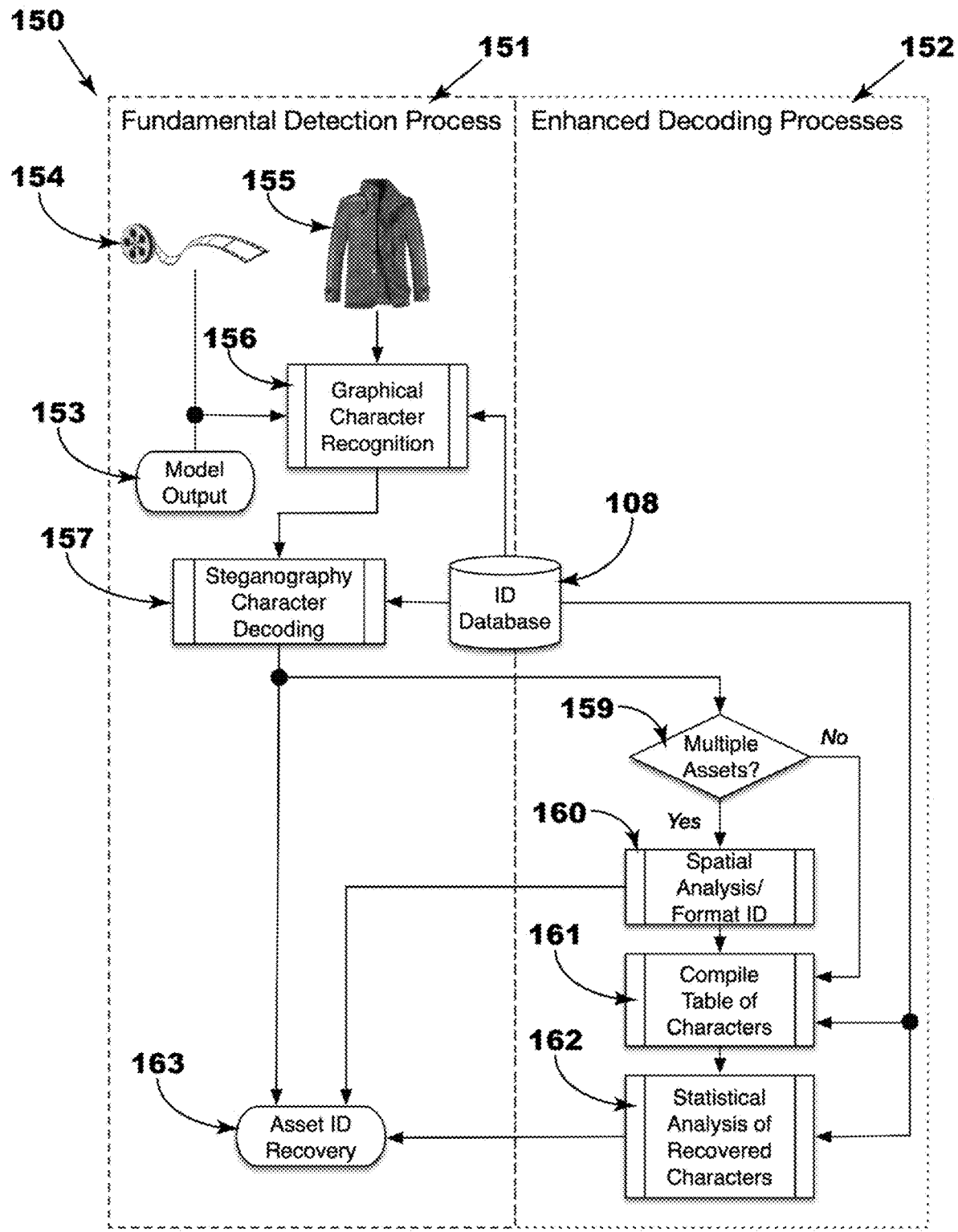
FIG. 1B is an overall swim lane block diagram representative example providing a schematic graphical overview of a general embodiment of the system associated identifying and decoding the digital assets and/or digital asset family embedded in the model, video stream, and/or image(s) of FIG. 1A.

FIGS. 1A and 1B taken together, illustrate general embodiments for creating, embedding, detecting, and decoding identification code(s) with a family and/or specific digital asset. As illustrated in swim lane flowchart 100, the general embodiments of the disclosure associated with creating and embedding identification code(s) into at least one digital asset are conceptually divided into two groups (i.e., "Preamble Process" 101 and "Embedding Process" 102) by the two "swim lane" columns in FIG. 1A. Swim lane flowchart 150 shows the general embodiments of the disclosure associated with detecting and decoding identification code(s) from at least one digital asset also conceptually divided into two groups (i.e., "Fundamental Detection Process" 151 and "Enhanced Decoding Processes" 152) by the two "swim lane" columns in FIG. 1B. If a particular flowchart function appears completely within a swim lane, its functionality is limited to the process of the associated swim lane—e.g., Graphical Art Database 106 is exclusively part of the Preamble Process 101 of FIG. 1A. If a particular flowchart function appears between two swim lanes, its functionality is shared between the two swim lanes processes—e.g., ID Database 108 is shared between the Preamble Process 101 and the Embedding Process 102 of FIG. 1A.

The general embodiment swim lane 100 starts with a unique identification or "ID" code assigned to a specific digital asset or family of assets 103 as part of the Preamble Process 101. Both the assigned ID code and the at least one digital asset are logged in the ID Database 108. The ID code assigned to the at least one asset is next broken down into individual characters 104 (e.g., case sensitive alphanumeric characters) with the broken-down characters also logged into the ID Database 108 correlated with the assigned ID code. For each individual broken down character a graphical representation element is then generated 105. Each generated graphical representation element is preferably constructed from 107 generic graphical elements stored in a Graphical Arts Database 106 with the generic base graphical element(s) subsequently modified by the translation process 105 to encode at least one of the individual characters and its index or indices. Typically, the graphical elements stored in the separate Graphical Arts Database 106 will at least include a priori orientation or synchronization mark as well as positions and symbols for encoding binary character data. Of course, the generic base graphical elements may be designed as attractive features such as a button with distinct patterns of holes, or a pattern of stitching on virtual clothing, or an arrangement of pinstriping on a virtual car, etc.

Returning to the Preamble Process 101 ID code data flow of FIG. 1A, the encoded graphical elements produced by the translation process 105 are then also saved in the ID Database 108 linked to the assigned ID code. The ID Database 108 is shared with the Embedding Process 102 and drives the Embedding Process 102 with the generated graphical character elements being correlated 110 with at least one Digital Asset 109 such that it ultimately can be seamlessly integrated into the at least one Digital Asset 109 (e.g., FIG. 4, callout 400). The resultant ID embedded Digital Asset(s) 111 (FIG. 1A) is/are then integrated into the 3D Environment base model 112 where the embedded graphical character elements fully incorporated into the digital asset such that the resultant composite graphical character elements/ Digital Asset(s) 111 become an amalgamated portion of the asset(s).

Once the creating and embedding identification code(s) processes described in FIG. 1A are complete, this disclosure continues with the swim lane flowchart 150 (FIG. 1B) showing the general embodiments associated with detecting and decoding ID code(s) from the at least one digital asset. As shown in FIG. 1B the detecting and decoding ID code(s) processes are conceptually divided into two groups—i.e., Fundamental Detection Process 151 and Enhanced Decoding Processes 152.

The Fundamental Detection Process 151 begins with a plurality of video frames or still images (preferably garnered from samples covering the entire running time of the video feed) potential containing digital assets (e.g., the direct output of a model 153, video stream 154, or isolated asset 155 itself) being submitted for automatic Graphical Character Recognition 156. For each garnered video frame or image, the Graphical Character Recognition 156 process will identify whether graphical elements matching any of the formats logged in the ID Database 108 are found in the garnered images.

Preferably, the Graphical Character Recognition 156 process is a trained Artificial Intelligence (AI) algorithm which uses Machine Learning (ML) that has been trained to identify any graphical elements embedded in digital assets. Alternatively, the Graphical Character Recognition 156 process will utilize computer vision to recognize the outline of any graphical representation elements. Regardless of the graphical elements detection algorithms employed, all identification of graphical representation elements embedded in digital assets by the Graphical Character Recognition 156 process will be in concordance with the specifications and metrics of the possible graphical elements stored in the ID Database 108 as part of the Preamble Process 101 of FIG. 1A. Finally, any extracted graphical representation elements detected by the Graphical Character Recognition 156 (FIG. 1B) process are extracted from the background digital image and then passed to the separate Steganography Character Decoding process 157. In the special case where multiple graphical representation elements were detected by the Graphical Character Recognition 156 process, a flag indicating the number of different types of graphical representation elements detected will be passed to the separate Steganography Character Decoding process 157 in addition to the extracted graphical representation elements themselves.

The Steganography Character Decoding process 157 obtains the decoding information for the extracted graphical elements from the ID Database 108 with the specific decoding information linked to each graphic element detected by the Graphic Character Recognition process 156. This first order graphic representation element(s) decoding that is executed by the Steganography Character Decoding process 157 detects and utilizes the orientation or synchronization mark embedded in each graphic representation element to determine the positioning of the embedded data and then based on the index's orientation attempts to decode the individual character embedded in each extracted graphical representation element. In an optional preferred embodiment, any skew and/or shadows detected in each graphic representation element when compared to its theoretical ideal metric which is maintained in the ID Database 108 can be managed as tuning biases to aid the Steganography Character Decoding process 157. Thus, the Steganography Character Decoding process 157 essentially provides a first order decoding and data extraction mechanism for each received graphic representation element. At this point, this first order decoding and data extraction can be applied directly to Asset ID Recovery 163 or alternatively and preferably forwarded to supplementary Enhanced Decoding Processes 152 embodiments.

Assuming Enhanced Decoding Processes 152 are selected, an initial test is typically performed to determine algorithmically whether Multiple Assets 159 (i.e., more than one asset with different assigned ID codes) are present within the graphical elements garnered from the video frames or models. Assuming only one digital asset is detected 159 the processing advances to the Compile Table of Characters process 161 for further execution. However, if multiple digital assets are present in the same garnered video frames or models, a special spatial analysis process 160 will typically be employed to identify which graphic representation elements are from a given digital asset and which elements are from a different digital asset. Additionally and preferably, the presence of multiple digital assets in the same garnered video frames or models may be further mitigated by the use of (and recognition of) different graphic representation elemental formats for different digital assets.

At this point, the output of the spatial analysis and/or graphic representation format identification process 160 can be applied directly to Asset ID Recovery 163 or alternatively and preferably forwarded to the additional table computation 161 and statistical analysis 162 processes. The Compile Table of Characters process 161 does, as its name implies, compiles detected graphical elements applying the extracted index and values into an ascribed probability table where a statistical picture of the decoded extracted individual characters can be generated (e.g., FIG. 2A) for possible error correction. The ensuing statistical analysis of the compiled table of characters is accomplished by comparing the compiled table against the set of known a priori ID codes in order to determine the probability of the decoded ID code being a match to an a priori ID code. The output of the Statistical Analysis of Recovered Characters 162 (FIG. 1B) is ultimately applied to the Asset ID Recovery 163; thereby enabling the identification of digital assets embedded in models 153, video streams 154, or images 155 (FIG. 1A).

Figure 3A:
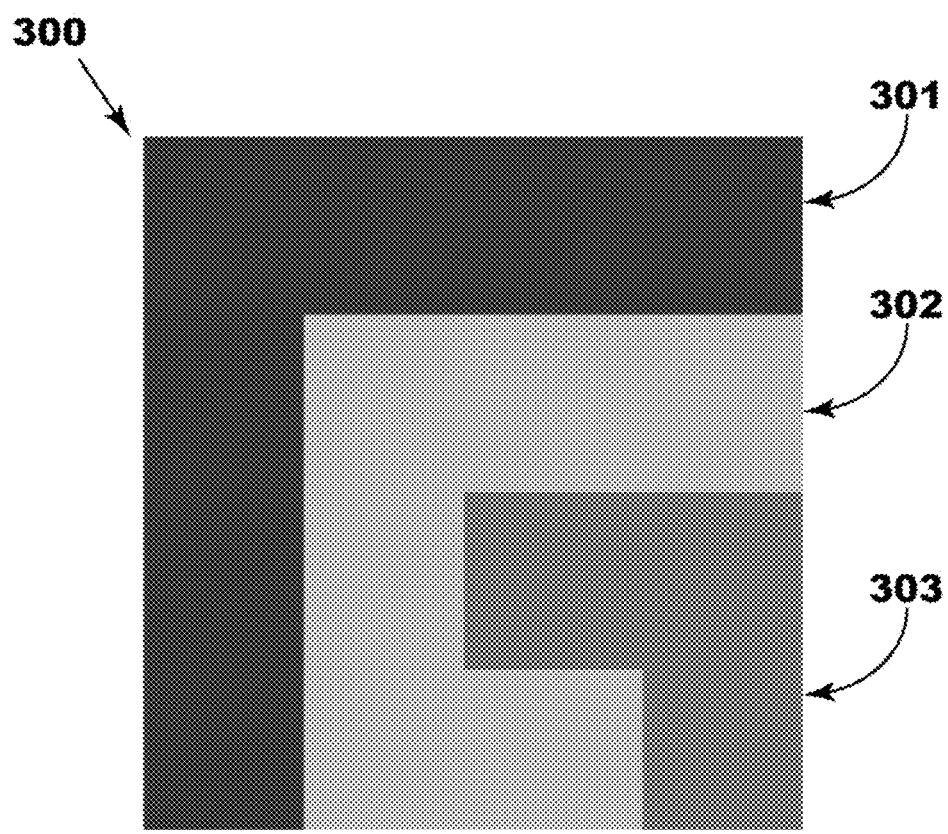
FIG. 3A is a first simplified explanatory embodiment of a graphically formatted element capable of being assigned to a digital asset that is compatible with the embodiments of FIGS. 1A and 1B.
Figure 3B:
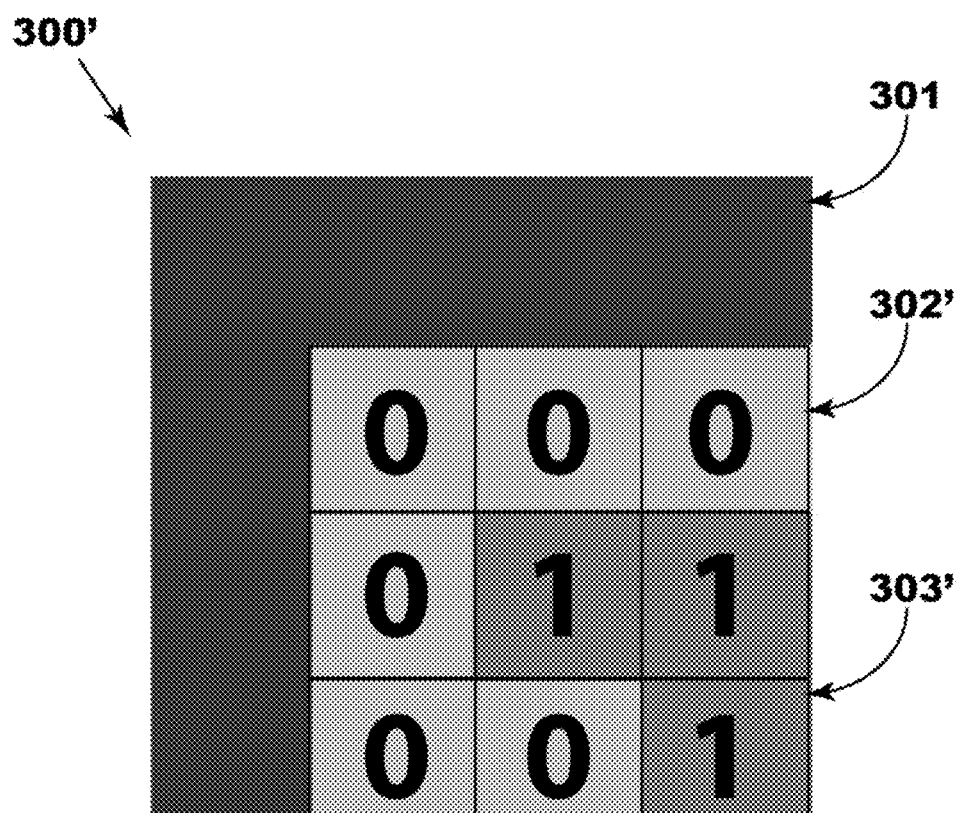
FIG. 3B is the first simplified explanatory embodiment of a graphically formatted element of FIG. 3A highlighting its 9-bit 3×3 data grid.

A simplified exemplary embodiment of compiling a table of characters recovered from detected graphical elements with the compiled table's subsequent statistical analysis creating a process for error correction and data recovery is provided in FIGS. 2A, 2B, 3A, and 3B. In this simplified example embodiment, a base-64 code was selected with an eight alphanumeric characters long ID code—i.e., exemplary ID code "ZXhhbXBs". As illustrated in FIGS. 3A and 3B, the first alphanumeric character "Z" of the exemplary "ZXhhbXBs" ID code is encoded in the graphically formatted element 300 and 300'. In this simplified example, each alphanumeric character requires 6-bits of data with its associated index requiring 3-bits of data, thus a total of 9-bits will be encoded for each graphical element—i.e., substantially less data than theoretical barcode embodiments that would typically encode hundreds or even thousands of bits. For the explanatory purposes of this simplified example, the exact method of encoding binary data into the graphically formatted element (e.g., color, orientation of symbols, shape of symbols, least significant bit, etc.) is irrelevant, the significant concept of this simplified example is to teach how compiling a table of characters and subsequently performing a statistical analysis of the compiled table can be utilized to decode, error correct, and reconstruct an ID code for a digital asset even when noise is present in the background of the image(s) and/or portions of the graphically formatted element 300 may be obstructed or skewed.

The exemplary graphically formatted element (300 and 300') can be viewed as a 3×3 grid where light grey (302 and 302') represents binary logic "02" and medium grey (303 and 303') represents binary logic "12". The black portion of the graphically formatted element (300 and 300') represents an orientation or synchronization mark 301 that may also be utilized to help differentiate graphically formatted elements associated with different digital assets.

Thus, if each graphical representation element encodes a single alphanumeric character from the ID code, each graphical representation element will encode 9-bits of data in this simplified example. Assuming graphically formatted shape 300 and 300' encodes the first character "Z" ("0110012") of the ID code its index would be "0002". Then the binary data embedded in the graphically formatted shape 300 would be "0000110012". As shown in 300' of FIG. 3B, these 9-bits of data representing the alphanumeric character "Z" in the first (zero) indexed position are represented in the simplified exemplary 3×3 grid from top left to lower right with the binary logic "02" bits illustrated by callout 302' and the binary logic "12" bits illustrated by callout 303'.

Again, the graphical representation element example of FIGS. 3A and 3B are drawn in a simplified form for illustrative purposes. A wide range of encoded graphically formatted elements (e.g., FIGS. 3C thru 3E) are possible and can be preferably selected to seamlessly merge with the design of the digital asset so that the graphical representation elements are not obvious to the casual observer and do not negatively impact the aesthetics of the digital asset. Any candidate graphically formatted shape can be optionally tested by Artificial Intelligence (AI) Machine Learning (ML) or other algorithms to determine if the candidate graphically formatted element is compatible with the detection algorithm's "vison." The colors of the graphical representation element are typically not important so long as there is sufficient contrast for the graphically formatted element to be detected. This typical insignificance of color in identifying a graphically formatted element is preferable since it aids the designer in seamlessly blending graphically formatted elements into digital assets.

Once each graphically formatted element is detected its embedded index and binary data are extracted. Depending on the code used to encode the index and associated binary data (alphanumeric characters in this example) the value of each extracted index and binary code may be assigned a probability and compared to other extracted indices and binary data in a process similar to information theory's well known Forward Error Correction (FEC). However, with the innovation of this disclosure, normal FEC informational redundancy is supplanted by the strategic assignment of ID codes from the much larger theoretical space of all possible ID codes such that each newly assigned ID code is selected to differ significantly from the set of previously assigned ID codes thereby significantly reducing the Shannon entropy of ID codes relative to each other and consequently enabling statistical reconstruction in place of traditional redundancy reconstruction.

With the simplified example of FIGS. 2A, 2B, 3A, and 3B each ID code is comprised of eight alphanumeric characters (e.g., "ZXhhbXBs") encoded in Base64 resulting in a total of 281,474,976,710,656 different possible ID codes. Clearly, the number of possible ID codes greatly exceeds any reasonable number of digital assets to be assigned ID codes. Thus, any newly assigned ID code can be selected for its uniqueness relative to other previously selected ID codes. As will be shown, this unique ID code selection process can be designed such that a statistical analysis of extracted data can be used to reconstruct the original correct ID code in the presence of noisy and missing data.

Returning to exemplary FIG. 2A, as graphically formatted elements are detected and processed from a particular digital asset a statistical picture of the extracted ID code can be tabulated 200. In the simplified example 200, alphanumeric digital asset ID code "ZXhhbXBs" is extracted (including simulated background noise) and tabulated from six garnered video frames aligned chronologically on the table's y-axis 201 resulting in three extracted data characters 202 (x-axis) from three separate graphically formatted elements (identified by Index numbers) per garnered video frame. An initial cursory processing analysis of compiled table 200 will readily conclude that there is a very high probability that an encoded asset is present in the six garnered video frames 201. A secondary more detailed analysis of compiled table 200 reveals that there is a 75% probability that the extracted data from the encoded asset equates to asset ID code "ZXhhb?Bs" with a 25% probability that the encoded asset extracted data equates to asset ID code "XXhhb?BS"—the question mark "?" appearing in both sets of extracted data asset ID codes was inserted to indicate that a graphically formatted element with a character Index-5 (sixth position) was not extracted from any of the six garnered video frames (possibly occluded in all six garnered video frames).

At this point in the decoding process if sufficient accuracy has not been achieved additional video frames may be garnered. However, it can never be ensured that all graphically formatted elements (eight in this example) associated with a digital asset can be detected and extracted from any given video stream since some 3D graphically formatted elements can be occluded or oriented away from the 2D "camera's view" in any given video stream. Nevertheless, any set of extracted and decoded graphically formatted elements' data can be compared to the listing of a priori known asset ID codes for possible statistical reconstruction. In the simplified example 200 of FIG. 2A, there could be five sets of a priori known alphanumeric asset ID codes assigned—i.e., 13bXkLBs
ZXhhbXBs
A44bXpBs
ZXhhb4Bs
98UiK0Ew In this simplified example 200 of FIG. 2A, graphically formatted elements were decoded as a "Z" alphanumeric character with an Index of "0" in three of the six video frames (i.e., Video Frames 1, 3, and 5) with one graphically formatted element decoded as a "X" alphanumeric character and an Index of "0" in Video Frame 4. Thus, it would appear that noise was present in the extraction and decoding process associated with Index-0 since the same alphanumeric character was not detected in the four video frames where graphically formatted elements with Index-0 were detected. Additionally, in the same simplified example 200, the graphically formatted element associated with Index-5 did not result in the extraction and decoding of any characters, also inferring the presence of noise and/or occultation or orientation errors. However, the graphically formatted elements associated with Indexes 1 thru 4, 6, and 7 do appear to have been successfully extracted and decoded throughout the six garnered video frames. Therefore, when comparing the extracted and decoded characters in table 200 of FIG. 2A with the five sets of a priori known alphanumeric asset ID codes in this example it can be seen that there is a 50% probability that the correct asset ID code is "ZXhhbXBs" and a 50% probability that the correct asset ID code is "ZXhhb4Bs". Since there are only two a priori ID codes that can possibly match the characters in table 200, the value in Video Frame 4 for Index-0 must be incorrect, because there is no other possible match with the five exemplary a priori ID codes. Of course, as is apparent to one skilled in the art, in this simplified example of table 200 if a priori ID code "ZXhhb4Bs" were previously structured to ensure at least three different characters from a priori ID code "ZXhhbXBs" the correct asset ID code could have been determined in this simplified example with a high degree of certainty.

As previously discussed, in this example with eight-character Base64 encoding, there are a total of 281,474,976,710,656 different possible ID codes. When ID codes are assigned such that they are distributed evenly through the available character space the ability to error correct and reconstruct ID codes increases with the diversity of the assigned ID codes. For example, assuming there are a million distinct digital assets being tracked at a given time the number of graphical codes that must be extracted and decoded to identify a particular asset with a high degree of certainty would be very low. In other words, if n is the number of characters captured and t is the total number of ID codes in ID Database 108 (FIGS. 1A and 1B), then the number of ID codes matching the (n−1) characters matched is:

$$\frac{64^{(n-1)-1}}{64^8}$$

... with the average number of matches for a sample t becoming:

$$\left(\frac{64^{(n-1)-1}}{64^8}\right)*t$$

FIG. 2B illustrates a tabulation 210 of the ratio of incorrect ID code matches to non-matches resulting in the probability of an incorrect ID code match from the extracted and decoded graphically formatted element data. Table 210 is organized with its far left column representing the number of matching extracted and decoded characters 211 from graphically formatted elements with a perfect eight matches on the top row descending to zero matches on the bottom row. The next column 212 lists the probability of a false match when there are 1,000 assigned digital asset codes out of the Base64 different possible ID codes total of 281,474,976,710,656. Column 213 lists the probability of a false match when there are 10,000 assigned digital asset codes out of the Base64 different possible ID codes total of 281,474,976,710,656 and column 214 lists the probability of a false match when there are 100,000 assigned digital asset codes out of the Base64 different possible ID codes.

The first row of table 210 lists the scenario where all eight characters were successfully extracted and decoded for a given ID code with the corresponding probability of an incorrect match at zero since all eight characters were extracted and decoded. As the number of successfully extracted and decoded characters are reduced row-by-row it can be seen that the probability of an incorrect ID code match increases, culminating in absolute certainty for the special case of zero successfully extracted and decoded characters. Thus, as shown in table 210 even only two unambiguous matches is likely to produce a reasonably high confidence as to the identification of an ID code of an asset with three or more unambiguous matches almost certain assuming the assignment of ID codes is distributed heterogeneously through the available character space.

Figure 3C:
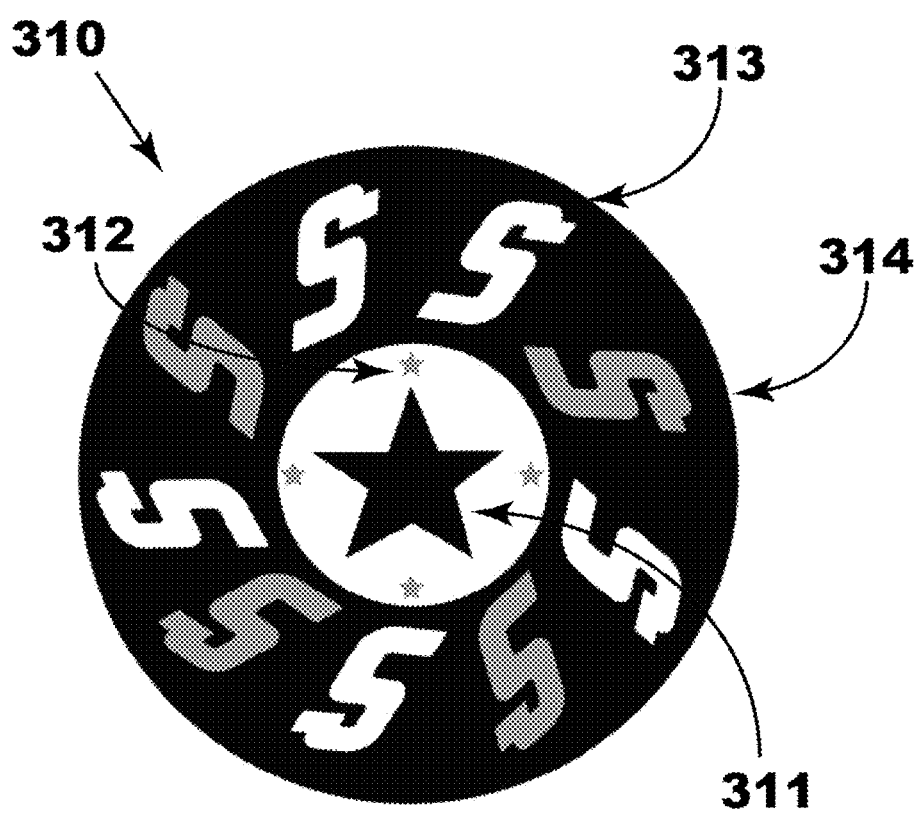
FIG. 3C is a second simplified embodiment of a graphically formatted element that is capable of being assigned to a digital asset that is compatible with the embodiments of FIGS. 1A and 1B.

FIG. 3C is an exemplary embodiment of a graphically formatted element 310 that is capable of being assigned to a digital asset. While similar in concept to the simplified graphically formatted element of FIGS. 3A and 3B, with the FIG. 3C example the graphically formatted element 310 is designed to be more visually compatible and/or stealthy when viewed in combination with its digital asset. For example, graphically formatted element 310 can be placed on the digital asset leather jacket 401 of FIG. 4 where element 310 of FIG. 3C is button 403 on FIG. 4.

Nevertheless, graphically formatted element 310 of FIG. 3C still includes the fundamental components of the previous simplified embodiment—i.e., orientation or synchronization marks and embedded data elements. In the example of FIG. 3C the graphically formatted element's 310 orientation or synchronization marks are a combination of the graphically formatted element's 310 shape (i.e., an outer and inner circle of different colors) with a large star 311 in the center of the inner circle accompanied by four smaller orientation stars 312 denoting the orientation starting point of the embedded data elements—i.e., the position where the smaller star 312 is aligned with the larger star's 311 point denotes the starting point. Additionally, in this example, the smaller orientation stars 312 are imaged with the same color as a logic "12" binary data symbol; but, of course in a different example, the smaller orientation stars 312 could be imaged with the same color as a logic "02" binary data symbol. The nine "S" symbols comprise the data elements with a white "S" denoting a logic "02" binary data symbol and a grey "S" denoting a logic "12" binary data symbol in this example. Thus, beginning with the orientation starting point the embedded data (3-bit index and 6-bit data) would decode as "0101010102".

Figure 3D:
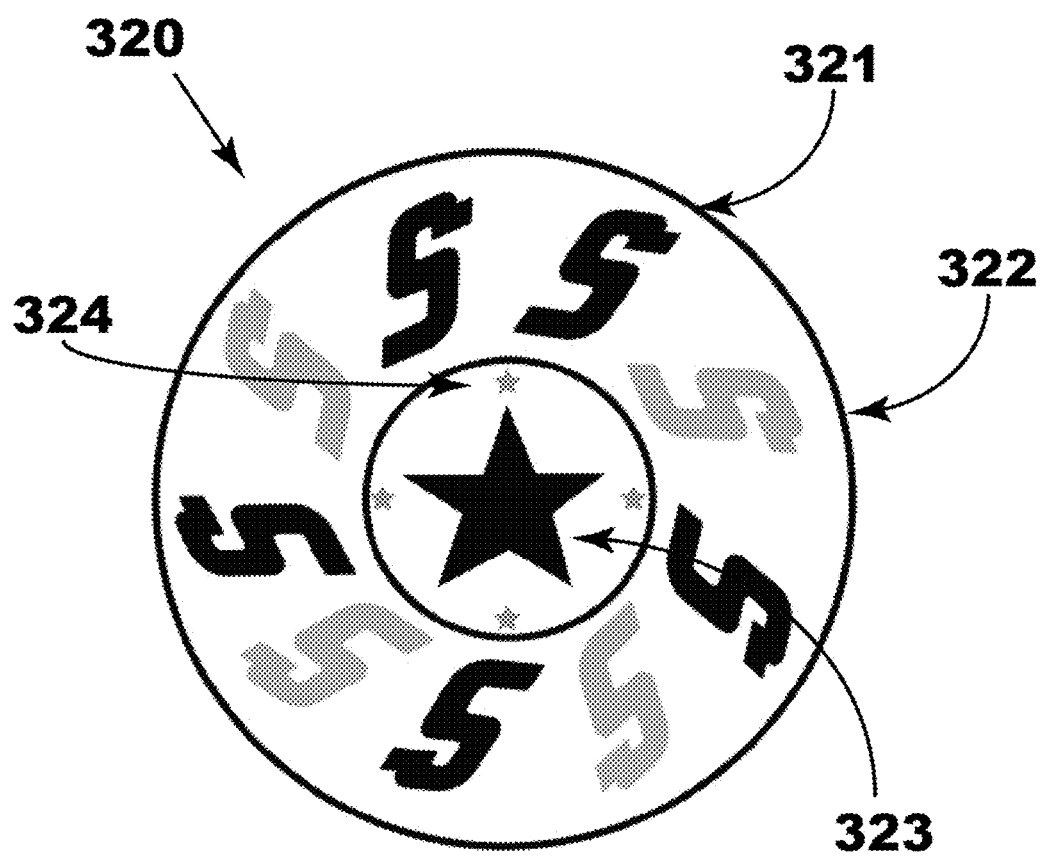
FIG. 3D is a third simplified embodiment of graphically formatted element capable of being assigned to a digital asset that is compatible with the embodiments of FIGS. 1A and 1B.

FIG. 3D is another exemplary embodiment of a graphically formatted element 320 that is similar in design to FIG. 3C. As shown in FIG. 3D, graphically formatted element 320 features identical orientation or synchronization marks to FIG. 3C with a combination of the graphically formatted element's 320 shape (FIG. 3D) plus a large star 323 in the center of the inner circle accompanied by four smaller orientation stars 324 denoting the orientation starting point of the embedded data elements—i.e., the position where the smaller star 324 is aligned with the larger star's 323 point denoting the starting point. As before, the smaller orientation stars 324 are imaged with the same color as the logic "12" binary data symbol and the nine "S" symbols comprise the data elements with a black "S" denoting a logic "02" binary data symbol and a grey "S" denoting a logic "12" binary data symbol in this example. Thus, beginning with the orientation starting point the embedded data (3-bit index and 6-bit data) would decode as "0101010102".

Figure 3E:
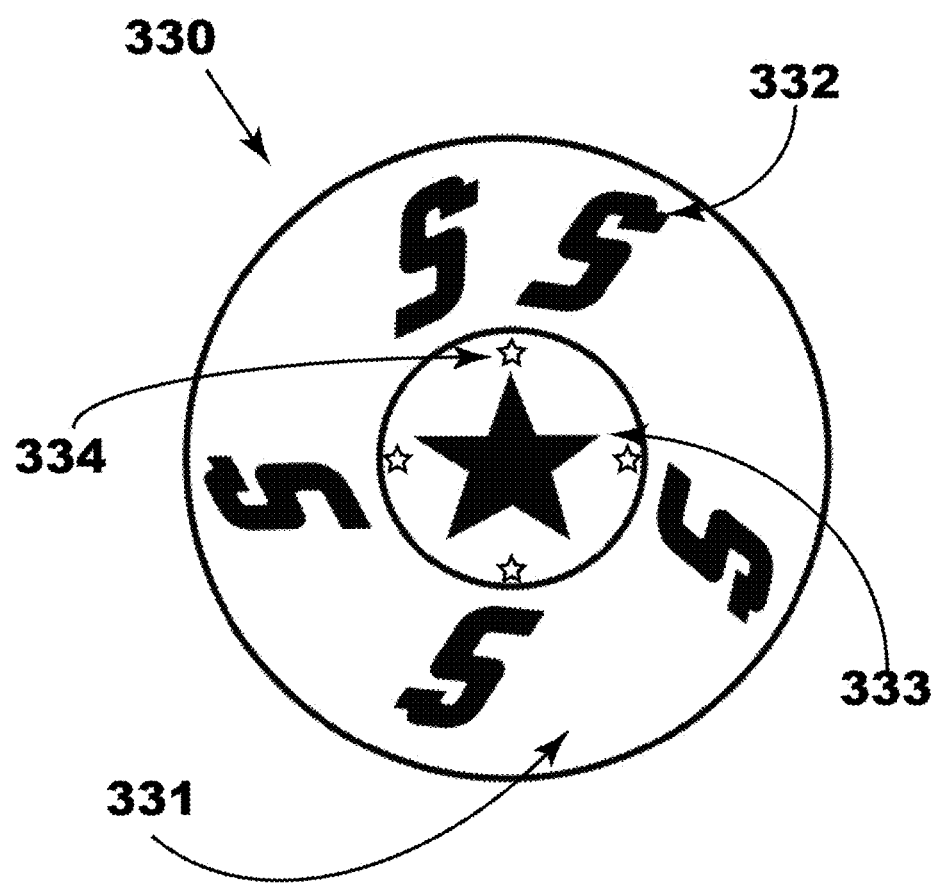
FIG. 3E is a fourth simplified embodiment of graphically formatted element capable of being assigned to a digital asset that is compatible with the embodiments of FIGS. 1A and 1B.

FIG. 3E is an alternative exemplary embodiment of a graphically formatted element 330 that is similar in design to FIGS. 3C and 3D with the difference being that in FIG. 3E all the graphically formatted element's 330 logic "12" binary symbols or digits are obfuscated. As shown in FIG. 3E, graphically formatted element 330 features similar orientation or synchronization marks to FIGS. 3C and 3D with a combination of the graphically formatted element's 330 shape (FIG. 3E) including a large star 333 in the center of the inner circle accompanied by four smaller orientation stars 334 denoting the orientation starting point of the embedded data elements—i.e., the position where the smaller star 334 is aligned with the larger star's 333 point denoting the starting point. As before, the smaller orientation stars 334 are imaged with the same color (white) as a logic "12" binary data symbol; however, in the example of FIG. 3E both the image and background colors are white resulting in no visible logic "12" binary data digits. The black "S" denotes a logic "02" binary data symbol. Thus, the nine "S" symbols comprising the data elements are present, but only the black "S" logic "02" symbols are visible with the a priori uniform spacing between symbols or digits indicating the position of each symbol or digit—i.e., if a black "S" is present at an a priori spacing the symbol or digit is a logic "02" and if no "S" is present at an a priori spacing the symbol or digit is a logic "12". Thus, beginning with the orientation starting point the embedded data (3-bit index and 6-bit data) would decode as "0101010102".

Figure 4:
FIG. 4 is an example of a digital asset with embedded graphically formatted elements in accordance with the embodiments of FIGS. 1A, 1B, and FIGS. 3C thru 3E.

Finally, FIG. 4 provides an exemplary illustration 400 of a digital asset (jacket) 401 with embedded graphically formatted elements 402 thru 406 shown as buttons on the jacket 401. Thus, in the exemplary illustration 400 of the jacket digital asset 401, the embedded graphically formatted elements 402 thru 406 can appear to be a natural part of the digital asset. Of course, the graphically formatted elements 402 thru 406 buttons of 400 are illustrated for instructional purposes and consequently purposely standout more than integrated graphically formatted elements would typically appear in real world applications.

It should be appreciated by those skilled in the art in view of this description that various modifications and variations may be made present invention without departing from the scope and spirit of the present invention. It is intended that the present invention include such modifications and variations as come within the scope of the appended claims.

What is claimed is:

1. A method of automatically assigning unique identification codes to digital assets by embedding a plurality of characters and a synchronization mark embodied as graphical representation elements into each assigned digital asset with each graphical representation element embedding an individual character such that the digital asset can be inserted into a video stream or image with its unique identification code sustained by the embedded plurality of graphical representation elements, the method comprising:

(a) assigning a unique identification code to each digital asset or digital asset family and then breaking the assigned unique identification code into a finite set of individual characters;

(b) embedding each individual character from the finite set of individual characters into a graphical representation element including:
  (i) an index of the character's position within the unique identification code and
  (ii) an embedding of the character itself;
(c) embedding an orientation or synchronization mark into each graphical representation element identifying the graphical representation element and the orientation and starting sequence of the embedded characters; and
(d) embedding all of the graphical representation elements created from the finite set of individual characters into the digital asset, thereby enabling the digital asset's unique identification code to be reconstructed from the plurality of graphical representation elements.

2. The method of claim 1 wherein the index is embodied as three binary bits.

3. The method of claim 1 wherein the character is embodied as six binary bits.

4. The method of claim 1 wherein differently formatted graphical representation elements are assigned to each digital asset or digital asset family.

5. A method of automatically detecting and decoding unique identification codes assigned to digital assets in a video stream or image from a plurality of graphical representation elements embedded into each assigned digital asset with each graphical representation element embodying an individual character of the unique identification code and an orientation or synchronization mark, the method comprising:
(a) identifying each graphical representation element by its orientation or synchronization mark and extracting the graphical representation element from the digital asset in the video stream or image;
(b) decoding the individual character embodied in each extracted graphical representation element;
(c) compiling a table of characters from the extracted and decoded graphical representation elements for the digital asset and performing a statistical analysis by ergodically comparing the extracted characters to a set of possible unique identification codes; and
(d) recovering and error correcting the extracted characters by matching the extracted characters to an a priori preassigned asset identity code.

6. The method of claim 5 wherein a plurality of digital assets are contained within the same video stream or image.

7. The method of claim 6 wherein different graphical formats are decoded for each digital asset or digital asset contained within the same video stream or image.

8. The method of claim 6 wherein each individual digital asset is virtually isolated by spatial analysis video stream or image prior to identification and decoding.

* * * * *